US012665472B2

(12) United States Patent
      Greiter

(10) Patent No.:     US 12,665,472 B2
(45) Date of Patent:         Jun. 23, 2026

(54) MOTOR UNIT HAVING FLOW GENERATING UNIT TO DELIVER AIR INTO A ROTOR GAP TO REDUCE FRICTION

(71) Applicant: AUDI AG, Ingolstadt (DE)

(72) Inventor: Ivo Greiter, Eitensheim (DE)

(73) Assignee: AUDI AG, Ingolstadt (DE)

( * ) Notice: Subject to any disclaimer, the term of this patent is extended or adjusted under 35 U.S.C. 154(b) by 238 days.

(21) Appl. No.: 18/494,691

(22) Filed: Oct. 25, 2023

(65) Prior Publication Data

US 2024/0146155 A1     May 2, 2024

(30) Foreign Application Priority Data

Oct. 26, 2022     (DE) .......................... 102022128325.9

(51) Int. Cl.
       *H02K 9/197*          (2006.01)
       *H02K 7/116*          (2006.01)
       *H02K 9/06*            (2006.01)
(52) U.S. Cl.
       CPC ............. *H02K 9/197* (2013.01); *H02K 7/116* (2013.01); *H02K 9/06* (2013.01); *H02K 2201/03* (2013.01)
(58) Field of Classification Search
       CPC .......... H02K 9/06; H02K 9/197; H02K 7/116; H02K 2201/03
       See application file for complete search history.

(56) References Cited

U.S. PATENT DOCUMENTS

2019/0199169 A1*    6/2019    Huang ...................... F02C 7/06
2021/0083555 A1*    3/2021    Lahr ........................ H02K 1/32
2022/0216771 A1*    7/2022    Kawashima ........ F16H 57/0441

FOREIGN PATENT DOCUMENTS

DE              2724420 A1      12/1977
JP          2003250248 A         9/2003
WO      WO 2004070919 A1       8/2004
WO      WO 2020167259 A1       8/2020

* cited by examiner

*Primary Examiner* — Tulsidas C Patel
*Assistant Examiner* — Robert E Mates
(74) *Attorney, Agent, or Firm* — Seed Intellectual Property Law Group LLP

(57)                ABSTRACT

A motor unit is provided having an electric motor, which is arranged in a housing, wherein the motor unit comprises a lubricant circuit, which cools and lubricates the electric motor, wherein the electric motor comprises a stator and a rotor, which is mounted rotatably in the stator, being connected fixed to the housing, while between the stator and the rotor there is a rotor gap. The motor unit further comprises a lubricant pump, which is fluidically connected to the stator housing, and a flow generating unit, which draws in air from the housing and blows the air into the rotor gap in order to remove lubricant from the rotor gap and reduce the internal friction in the electric motor. A method is also provided for reducing the internal friction in a motor unit.

17 Claims, 2 Drawing Sheets

MOTOR UNIT HAVING FLOW GENERATING UNIT TO DELIVER AIR INTO A ROTOR GAP TO REDUCE FRICTION

BACKGROUND

Technical Field

The present disclosure relates to a motor unit having an electric motor, and a method for reducing the internal friction in a motor unit.

Description of the Related Art

Oftentimes a lubricant such as lubricating oil will be used for the cooling and lubricating of electric motors in a motor unit. In order to assure a long-lasting safe operation of the motor unit, the lubricant needs to be conducted in a circuit through the electric motor. In this way, heat is taken up by the lubricant in the electric motor and given off once again at a different place in the motor unit. In order to assure the operating safety in all load instances, a dry sump lubrication can be used for example, in which lubricant is drawn in from the electric motor or an associated transmission and stored in a lubricant tank. From this lubricant tank, the lubricant is then taken back to the electric motor and to other components of the motor unit at different pressure levels. This concept provides a dependable lubrication of all components in all load scenarios, but it is costly and it requires a number of components. Due to the circulation of the lubricant in the motor unit, lubricant also gets into the rotor gap between the nonmoving stator and the rotating rotor of the electric motor. The lubricant in the rotor gap is responsible for friction losses in the electric motor, which lead to excessive consumption of electric energy and an additional heating of the electric motor.

The document US 2021/0083555 A1 describes a method for reducing the friction caused in a rotor gap by the lubricant located there. In this method, a pump arranged in the housing of the electric motor is used to generate an air flow, which removes the lubricant from the rotor gap.

The document DE 27 24 420 A1 describes a gas-cooled motor unit. The rotor comprises gas inlets, gas outlets, and ducts arranged between them. Upon rotation of the rotor, cooling gas is drawn in by the rotor through the gas inlets, the cooling gas is taken through the ducts, and it is then blown out once again through the gas outlets, after a heat transfer from the rotor to the cooling gas.

The document WO 2004/070919 A1 describes a cooling system for an electric motor. This gas-cooled electric motor is cooled in that an axial pump mounted on the rotor shaft pumps cooling gas in the longitudinal direction through the rotor gap.

BRIEF SUMMARY

Embodiments disclosed herein provide solutions with which the friction generated by lubricant in an electric motor can be reduced, while at the same time the complexity of design of a motor unit encompassing such an electric motor is reduced.

Embodiments include a motor unit having an electric motor, which is arranged in a housing, wherein the motor unit may be summarized as including:

a lubricant circuit, which cools and lubricates the electric motor, wherein the electric motor includes a stator and a rotor, which is mounted rotatably in the stator, being connected fixed to the housing, while between the stator and the rotor there is a rotor gap, wherein the stator is enclosed for at least a portion by a stator housing, which is arranged inside the housing, the stator housing being filled at least partly with lubricant and belonging to the lubricant circuit, at least one lubricant pump, which is fluidically connected to the stator housing and receives lubricant from the stator housing, wherein the lubricant pump comprises at least one outlet for lubricant, which is fluidically connected to the stator and the rotor, and the lubricant pump delivers lubricant to the electric motor through the outlet, a flow generating unit, which draws in air from the housing and blows it into the rotor gap in order to remove lubricant from the rotor gap and thus reduce the internal friction in the electric motor, and wherein the rotor forms a pump of the flow generating unit and delivers air during its rotation into the rotor gap or to the rotor gap.

The motor unit according to at least one embodiment of the invention comprises an electric motor having a stator and a rotor, which are arranged in a housing. The motor unit includes a lubricant circuit, which on the one hand lubricates the moving parts and thus protects them against wear, and on the other hand cools the motor unit, especially the electric motor, in operation. In the following, the term lubricant shall be used, although this can also be called a coolant. The stator is accommodated in a stator housing, forming a partial region of the housing. The stator housing may be separated from the other housing regions, such as the region of the housing in which the rotor is located. However, it is also possible for the stator housing and the rest of the region of the housing to pass into one another and form a single common cavity.

Lubricant is constantly present in the stator housing. The stator housing thus forms a reservoir for lubricant, which is situated in the interior of the housing and contains at least some lubricant during the operation of the electric motor. In this way, no additional tank for lubricant is needed outside the housing. However, such an outside situated lubricant tank can be provided in many embodiments. The lubricant circuit includes, besides the stator housing, a lubricant pump, which takes up lubricant from the stator housing and transports it back to the stator and to the rotor across an outlet. By a taking up of lubricant by the lubricant pump is to be understood that the lubricant pump either sucks in lubricant or that the lubricant is delivered to or into the lubricant pump by excess pressure in other regions of the motor unit, such as the stator housing. In the interior of the electric motor, the lubricant takes up heat and thus cools the electric motor.

During the transport of the lubricant through the electric motor, lubricant also gets constantly into the rotor gap, which extends in the circumferential direction around the rotor between the rotor and the stator. The lubricant can get into the rotor gap in various ways: in a so-called wet-lubricated electric motor, the lubricant by design flows through all regions of the electric motor, including the stator and the rotor. In this way, heat is effectively carried away from all regions of the electric motor, but lubricant also penetrates in unwanted manner into the rotor gap. In embodiments of electric motors where the stator housing is at least partly sealed off against the rest of the housing, some lubricant usually also penetrates the seal of the stator housing in unwanted manner and gets into the rotor gap. Such leakage is hard to prevent by design measures in an electric motor. Furthermore, it is possible for lubricant to leak out from the rotor, such as its laminated cores, at higher engine speed of the rotor and in this way get into the rotor gap.

It is possible for the lubricant supplied to the bearings of the rotor shaft to penetrate from the bearings into the rotor gap. Upon rotation of the rotor, friction occurs due to the lubricant present in the rotor gap, which reduces the efficiency of the electric motor and thus of the motor unit. In order to remove lubricant which has gotten into the rotor gap, the motor unit may include a flow generating unit, which blows air into the rotor gap and thereby removes the lubricant located there. The rotor of the electric motor in this case forms the pump of the flow generating unit, which generates the air flow. Thanks to its rotary movement, the rotor acts like a flow pump and delivers air from the housing into the rotor gap. The rotor, which naturally turns during the operation of the electric motor, is used in a combined function also as the pump for the air flow. In this way, the number of necessary components in the motor unit is not increased, but at the same time the internal friction in the electric motor is significantly reduced by the flow generating unit. The air flow generated by the rotor removes at least the greatest portion of the lubricant from the rotor gap. At the same time, the air flow in the rotor gap brings about a pressure increase in the partial region of the housing in which the rotor is located. This pressure increase, in turn, brings about a decrease in the amount of lubricant flowing in the electric motor toward the rotor gap. In this way, the incoming flow of lubricant in the rotor gap is already reduced. The motor unit may encompass further components, which shall be described more closely for the embodiments.

In one embodiment the flow generating unit includes an oil separator, which is arranged in the flow direction of the air through the flow generating unit upstream from the rotor, wherein the oil separator separates lubricant present in the air in the housing and then delivers air with reduced lubricant content or lubricant-free air to the rotor working as a pump. In this embodiment, an oil separator is provided, which removes lubricant from the air drawn in. The air in the housing usually contains lubricant in operation of the motor unit. By providing an oil separator, it is ensured that the rotor does not bring any additional lubricant into the rotor gap through the air blown in. By an oil separator is meant here all components which remove lubricant from an air flow.

In another embodiment the rotor includes a rotor shaft, which is rotatably mounted in the housing, wherein the rotor working as the pump of the flow generating unit draws in air axially to the rotor shaft through at least one end region of the rotor shaft and delivers this air taken in radially to the rotor shaft to the rotor gap, wherein the rotor works like a flow pump. In this embodiment, the air flow in the flow generating unit is taken through the rotor shaft for a portion. The air flow is directed, at least at one end, in the axial or radial direction into the interior of the rotor shaft and then transported in the axial direction. After this, the air flow is taken radially to the rotor shaft through the rotor and in this way reaches the rotor gap. The rotating rotor acts in this case as a flow pump, by accelerating the air present in the rotor, so that it flows out from the rotor into the rotor gap.

The air exit of the flow generating unit may be situated substantially in the middle of the rotor in the axial direction to the rotor shaft and the air flows axially to the rotor shaft in two mutually opposite directions through the rotor gap or the air exit is situated in a marginal region of the rotor, axially to the rotor shaft, wherein the air flows axially to the rotor shaft in a direction through the rotor gap. The air exit of the flow generating unit is situated on the outer lateral surface of the rotor. The air exit can be situated in the middle of the rotor in the axial direction to the rotor shaft. The air flowing out from the air exit is pumped in two mutually opposite directions through the rotor gap and thus removes the lubricant present there. In the case of an arrangement of the air exit in the middle, the air flow will be taken through the laminated core of the rotor. Alternatively, the air exit may be situated in a marginal region in the axial direction to the rotor shaft, such as outside the laminated core of the rotor. In this arrangement, the air flow emerging from the air exit flows in only one direction through the rotor gap. An arrangement of the air exit in the laminated core has the advantage that the air flow acts as a cooling at the same time. An arrangement of the air exit in a marginal region of the rotor is more simple in design, since no ducts or conduits for the air need to be provided in the laminated core of the rotor.

In another embodiment the interior space of the stator housing not occupied by the stator is at least ⅔ filled with lubricant. In this embodiment, the stator housing may be sealed off, at least partially, from the rest of the housing, for example by metal sheets. The stator and in addition a hollow interior space are present in the stator housing. This hollow interior space is used as a reservoir or tank for lubricant. In operation of the motor unit, the hollow interior space in the stator housing is always at least two thirds filled with lubricant. It is also possible for the hollow interior space to be completely filled with lubricant. In the operation of the electric motor, the lubricant level in the stator housing may fluctuate. In this embodiment, an excess pressure prevails in the stator housing, which drives a portion of the lubricant located therein to the lubricant pump, which then takes this up.

In another embodiment a transmission is provided, which is coupled to the rotor, wherein the transmission is situated in a transmission housing, forming a partial region of the housing, while in the transmission housing there is provided a pan, which seals off one or more gear wheels at least partly against a lubricant reservoir, wherein the lubricant reservoir is formed by a partial region of the transmission housing situated at the bottom in the transmission housing, wherein the lubricant reservoir is part of the lubricant circuit and the lubricant pump is fluidically connected to the lubricant reservoir, draws in lubricant from the lubricant reservoir, and the outlet of the lubricant pump is fluidically connected to the transmission, wherein the lubricant pump delivers lubricant through its outlet to one or more gear wheels. In this embodiment, the motor unit also includes a transmission, which is connected to the electric motor. The transmission is accommodated in a partial region of the housing, the transmission housing, and it comprises at least one gear wheel, which stands in operative connection with the rotor shaft. The lower region of the transmission housing forms a lubricant reservoir, in which lubricant collects. The at least one gear wheel is sealed off by a pan against the lubricant reservoir, so that the gear wheel during operation does not dip into the lubricant in the lubricant reservoir. In this embodiment, the lubricant reservoir is connected to the inlet of the lubricant pump. The lubricant pump thus also draws in lubricant from the lubricant reservoir and transports it through its outlet to the at least one gear wheel of the transmission. In this way, the lubricant circuit also extends to the transmission. In some embodiments, the same lubricant may be used for the lubrication and cooling of the electric motor and the transmission, being transported by a single lubricant pump.

The lubricant reservoir may be fluidically connected to the stator housing and lubricant flows from the stator housing to the lubricant reservoir, wherein the lubricant pump receives lubricant from the lubricant reservoir and, through the fluidic connection between the stator housing and the lubricant reservoir, from the stator housing. In this embodiment, the stator housing and the lubricant reservoir in the transmission housing are fluidically connected to each other. Such a fluidic connection can be provided, for example, by a pipeline. In this embodiment, the stator housing and the lubricant reservoir together form a reservoir or tank for the lubricant. The lubricant pump can draw in lubricant both from the lubricant reservoir and also from the stator housing. Alternatively, the lubricant pump may be connected to only one of the stator housing or the lubricant reservoir in order to draw in lubricant.

In some embodiments, the flow generating unit may include an auxiliary pump, which draws in air from the housing and blows it into the rotor gap as needed or to supplement the rotor. In this embodiment, an auxiliary pump is provided to generate an air flow, besides the rotor acting as a pump. This auxiliary pump can additionally blow air into the rotor gap as needed, i.e., limited in time. Such a need for an additional air flow may be helpful for example before placing the electric motor in operation or when the electric motor is operating at low speed of the rotor, in order to effectively remove lubricant from the rotor gap.

In a further embodiment, a return line is provided, which connects the rotor gap to the stator housing and/or to the lubricant reservoir, wherein the return line carries the air blown from the flow generating unit through the rotor gap into the lubricant and this air travels through the lubricant back to the housing, such as the transmission housing. The air blown in from the flow generating unit to the rotor gap leaves the rotor gap and flows back to the housing, such as into the housing region around the rotor. A return line is provided for the return of this air, which may contain lubricant after its travel through the rotor gap, leading from the rotor gap or from a housing region in the vicinity of the rotor gap to the stator housing and/or to the lubricant reservoir. The connection of the return line is designed so that the transported air is taken to the lubricant in the stator housing and/or lubricant reservoir and rises there in the lubricant. Already at least a portion of the lubricant which is present in the transported air is given off in the lubricant reservoir. Alternatively, the return line may be designed or arranged such that the returning air does not emerge in the lubricant, but rather above the lubricant level in the housing. In this way, the formation of bubbles in the lubricant is avoided. In this alternative embodiment, the exit opening of the return line is arranged above the lubricant level in the lubricant reservoir or in the stator housing.

Some embodiments provide a method for reducing the internal friction in a motor unit according to one or more embodiments, wherein the method may be summarized as: drawing in air from the housing by the flow generating unit, wherein the rotor forms a pump of the flow generating unit; and blowing of the air into the rotor gap through the flow generating unit, wherein this air blown in removes lubricant from the rotor gap and thus reduces the internal friction in the electric motor.

Thanks to the method described herein, lubricant which is present in the rotor gap of an electric motor is at least for the most part removed from here. In this way, the internal friction in the electric motor between the rotor and the stator is significantly reduced. The method can be carried out in the sequence of the steps outlined above. The steps of the method be repeated continuously during the operation of the motor unit and can take place at the same time.

In a first aspect of the method, air is drawn in from the housing by the flow generating unit of the motor unit. The rotating rotor here serves as a flow pump, which draws in the air.

In a second aspect of the method, the air drawn in is blown into the rotor gap. This blowing is also performed by the rotor of the electric motor acting as a pump. In the rotor gap, the blown air ultimately displaces the lubricant and thus reduces the internal friction in the electric motor.

Thanks to the method described herein, the friction in the electric motor is reduced by removing lubricant from the rotor gap. Because the rotor is used as a driving pump for the removal of the lubricant, no additional pump is needed to generate the air flow. The method requires few components for its implementation and can be carried out with long-term stability.

Features, effects, and benefits which are disclosed in connection with the motor unit also count as disclosed in connection with the method. The same holds conversely: features, effects, and benefits which are disclosed in connection with the method also count as disclosed in connection with the motor unit.

BRIEF DESCRIPTION OF THE SEVERAL VIEWS OF THE DRAWINGS

Embodiments are represented schematically with the aid of the drawing and shall be further described with reference to the drawings.

DETAILED DESCRIPTION

Figure 1:
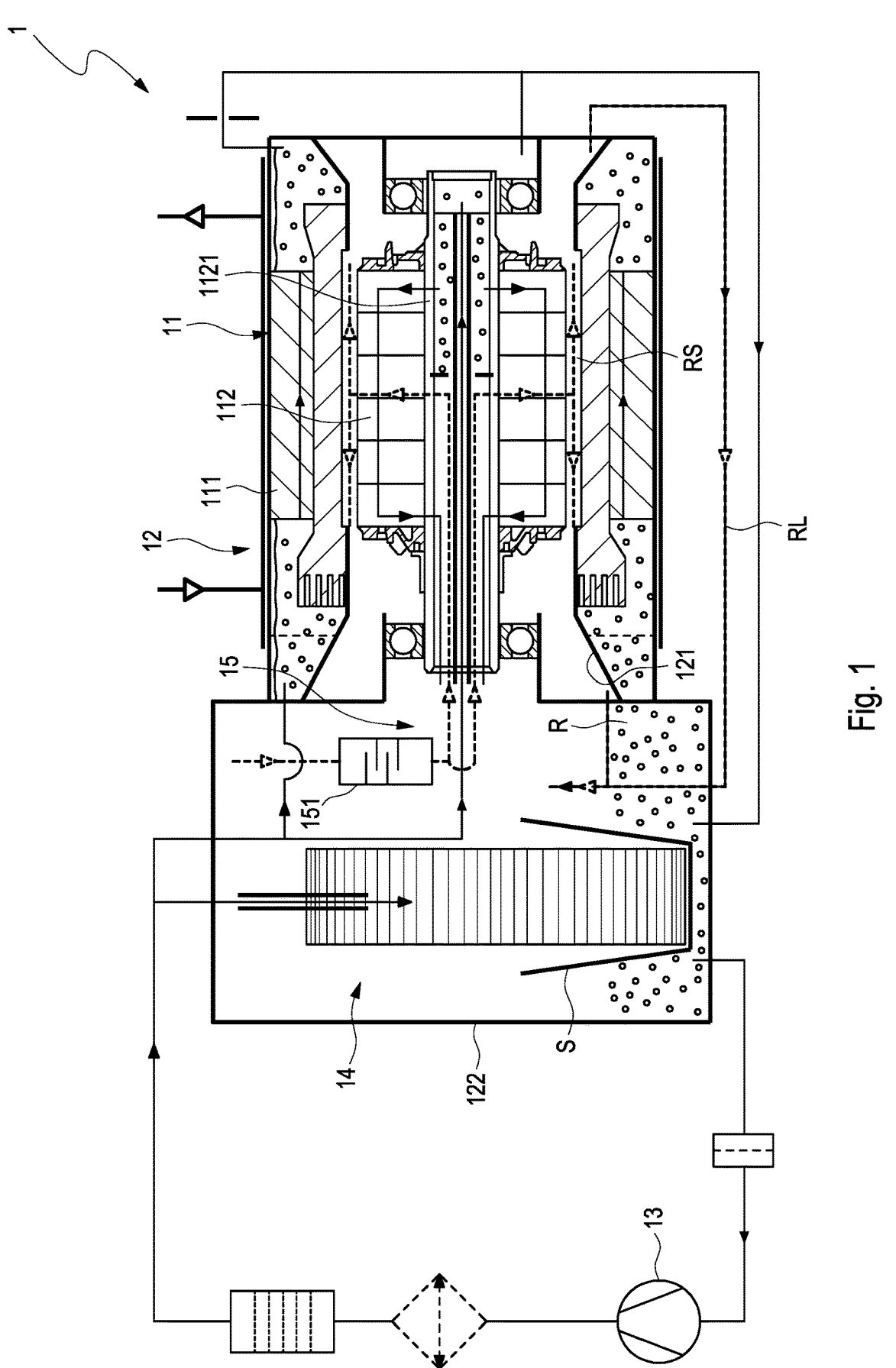
FIG. 1 shows a schematic view of an embodiment of a motor unit.

FIG. 1 shows a schematic view of an embodiment of a motor unit 1. The motor unit 1 shown comprises an electric motor 11, shown at right, which is mechanically coupled to a transmission 14, shown at left. The rotor shaft 1121 during operation transmits torque to the transmission 14, which transforms the rotary movement and puts it out across a power offtake shaft, not shown. The transmission 14 is optional, the rotor shaft 1121 can also be used directly as a power offtake shaft. The motor unit 1 is accommodated in a housing 12, comprising several partial regions. The stator 111 of the electric motor 11 is arranged in a stator housing 121. The stator housing 121 is bounded off and/or sealed off against the partial region of the housing 12 in which the rotor 112 is situated. The rotor 112 is located inside the stator 111 and in the embodiment shown it is mounted rotatably in the housing 12 by two bearings situated outside the rotor 112. Between the rotor 112 and the stator 111 there is found a rotor gap RS, which extends in the circumferential direction around the rotor shaft 1121. The transmission 14 comprises multiple gear wheels, only one of which is shown schematically. The transmission 14 is situated in a transmission housing 122, which belongs to the housing 12. The transmission housing 112 is connected in the interior of the housing 12 to the partial region in which the rotor 112 is situated. The lower region of the transmission housing 112 shown in the representation forms a lubricant reservoir R, in which lubricant is present. The lubricant is used in the motor unit 1 both for lubricating the moving parts and for cooling the electric motor 11. In the interior of the transmission housing 112 there is furthermore found a pan S, which seals off the gear wheel shown against the lubricant in the lubricant reservoir R. During the operation of the motor unit 1, lubricant is also applied through the outlet of the lubricant pump 13 to the gear wheel, but this is flung off by centrifugal forces upon rotation of the gear wheel and then collects in the lubricant reservoir R. The pan S prevents the gear wheel from coming into contact with the lubricant in the lubricant reservoir R during its rotation. In this way, the gear wheel delivers no lubricant from the lubricant reservoir R during its rotary movement. The motor unit 1 comprises a lubricant circuit, in which the stator housing 121 and the lubricant reservoir R serve as a reservoir or tank for the lubricant. In this way, no separate tank or reservoir is required for the lubricant, which reduces the complexity of the motor unit 1. The stator housing 121 is at least partially filled with lubricant.

In some embodiments, at least two thirds of the interior space of the stator housing 121 not occupied by the stator 111 is filled with lubricant. In the embodiment shown, the entire hollow interior space of the stator housing 121 is completely filled with lubricant. The lubricant in the stator housing 121 is in motion and flows through the stator 111, so that the latter is cooled. In the embodiment shown, the stator housing 121 is fluidically connected to the lubricant reservoir R. This means that lubricant can get from the stator housing 121 to the lubricant reservoir R or vice versa, through ducts for example. The lubricant circuit also includes the lubricant pump 13 situated in the representation outside the housing 12. The lubricant pump 13 is fluidically connected by a pipeline to the lubricant reservoir R and draws in lubricant from the latter. Indirectly, the lubricant pump also takes up lubricant from the stator housing 121 through the fluidic connection between the lubricant reservoir R and the stator housing 121. The lubricant pump 13 furthermore has an outlet, which in turn is fluidically connected by pipelines to the transmission 14, the stator housing 121, and the rotor shaft 1121. Through the outlet, the lubricant pump 13 delivers lubricant to the gear wheels, the stator 111 and the rotor 112, by which these components are both lubricated and cooled. Optionally, a heat exchanger can be arranged in the connection line between the lubricant pump 13 and the other components, which cools the lubricant before being supplied to the motor unit 1.

The motor unit 1 further comprises a flow generating unit 15. This flow generating unit 15 is designed to generate an air flow and to direct this flow into the rotor gap RS or to the rotor gap RS. The air flow displaces lubricant or lubricant mist from the rotor gap RS and thus reduces the internal friction of the electric motor 11 between the rotor 112 and the stator 111. The rotor 112 serves as the pump of the flow generating unit 15, which generates the air flow into the rotor gap RS. In this way, the rotor 112 besides its function as a driving element of the electric motor 11 also fulfills another function, namely, that of reducing the friction in the rotor gap RS. Because of this combined function, no additional pump is required to generate the air flow and thus the complexity and the number of components of the motor unit 1 are reduced. By virtue of its rotation, the rotor 112 draws in air from the housing 12 in the end region of its rotor shaft 1121 facing left and sends this air on at first within the rotor shaft 1121.

In the embodiment shown, the rotor 112 draws in air at the end face of the rotor shaft 1121 facing toward the direction of the transmission 14. The rotor 112 delivers the air, drawn in in the axial direction to the rotor shaft 1121, in the radial direction to the rotor shaft 1121 to the rotor gap RS. The air exit of the flow generating unit 15 is situated on the outer lateral surface of the rotor 112, forming a boundary of the rotor gap RS. The air exit in the embodiment shown is situated substantially in the middle of the length of the rotor shaft 1121. From the air exit, the air flow generated by the flow generating unit 15 flows in the direction axially toward the rotor shaft 1121 to the left and to the right through the rotor gap RS and thereby removes the lubricant which has gotten into the rotor gap RS.

In the embodiment shown, the air is taken through the laminated core of the rotor 112. Alternatively, the air exit may also be situated in an end region of the rotor 112 in the axial direction, such as outside the laminated core. In such an arrangement of the air exit in the end region, the air flow so generated then flows axially to the rotor shaft 1121 in only one direction through the rotor gap RS. The precondition for such an air flow in only one direction is that an excess pressure must prevail on the side of the rotor shaft 1121 where the air emerges from the rotor 112. The generating of such an excess pressure on one side of the rotor shaft 1121 can be done, for example, by sealing off the rotor gap RS on this side against the housing 12. Upon rotating, the rotor 112 acts like a flow pump, exerting centrifugal forces on air present in the rotor. In this way, an air flow is generated and further air is drawn in in the axial direction by the rotor shaft 1121.

In some embodiments, the rotor 112 or the rotor shaft 1121 may also have additional elements to generate an air flow. Such additional elements might be, for example, guide vanes, which create an air flow in the axial direction to the rotor shaft 1121. It is possible to provide an auxiliary pump in addition to the pump formed by the rotor 112, which likewise generates an air flow. Such an auxiliary pump can strengthen the air flow in particular at low speeds of the rotor 112 and thus effectively remove lubricant from the rotor gap RS. In the embodiment shown, the flow generating unit 15 further comprises an oil separator 151, which is situated in the flow direction of the air upstream from the rotor 112. This oil separator 151 removes lubricant from the air drawn in from the housing 12. In this way, the flow generating unit 15 is prevented from delivering lubricant into the rotor gap RS. After flowing through the rotor gap RS, the air flow is laden with lubricant and it flows back to the housing 12. In the embodiment shown, a return line RL is provided, which runs from the partial region of the housing 12 where the rotor 112 is situated and where the air flow leaves the rotor gap RS to the lubricant reservoir R in the transmission housing 122. In the lubricant reservoir R, the returning air is taken through the lubricant, so that already a large portion of the lubricant present in the air flow remains in the lubricant reservoir R.

Figure 2:
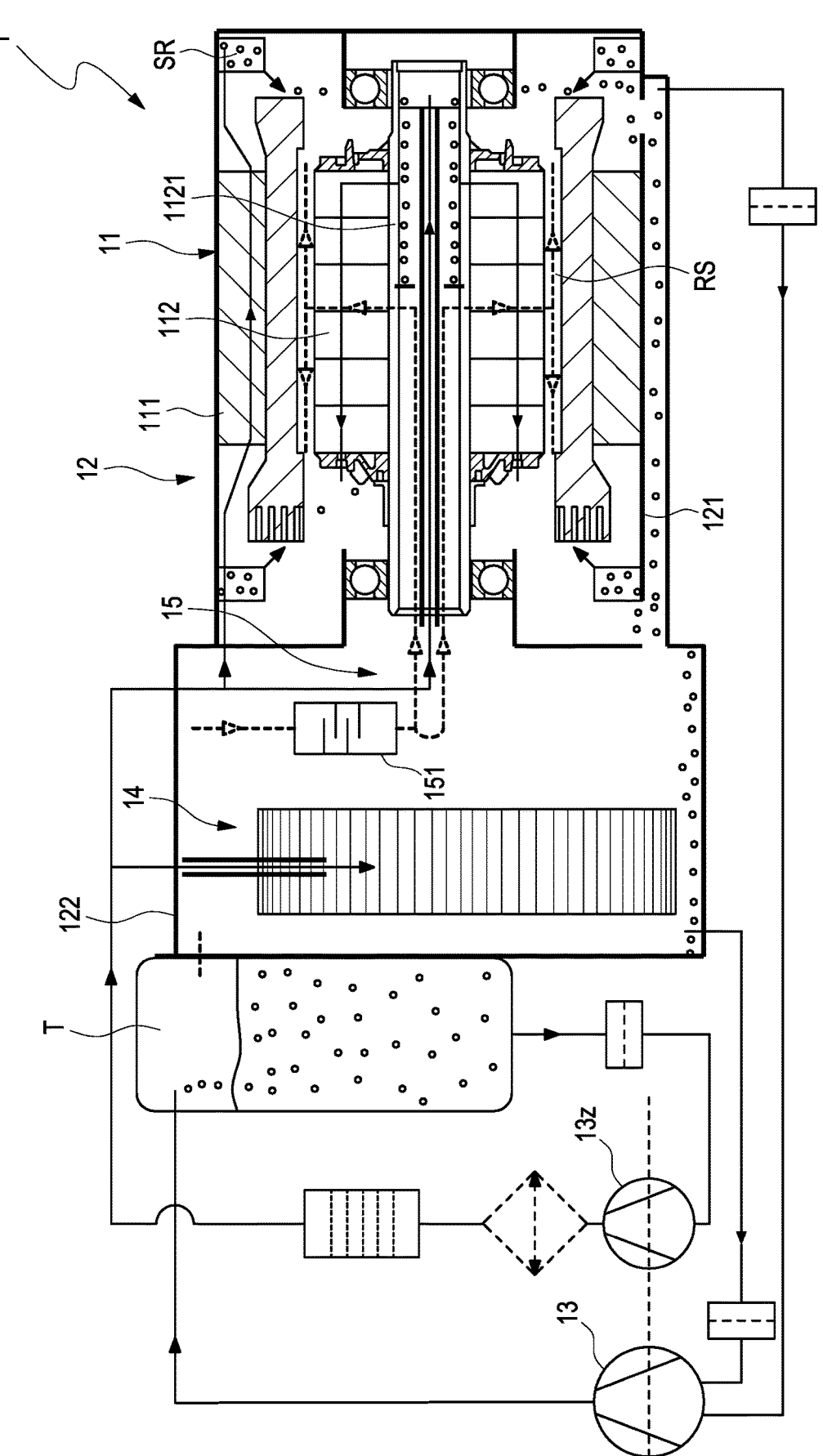
FIG. 2 shows a schematic view of an alternative embodiment of a motor unit.

FIG. 2 shows a schematic view of an alternative embodiment of a motor unit described herein. In this alternative embodiment, the motor unit 1 comprises a lubricant circuit which is different from the embodiment shown in FIG. 1. In the embodiment shown in FIG. 2, the electric motor 11 is a wet lubricated electric motor 11. Unless otherwise stated, for the components of the embodiment described in FIG. 2 which correspond to the embodiment in FIG. 1, refer to the description for FIG. 1. The embodiment shown in FIG. 2 also comprises a housing 12. This housing, in turn, comprises a partial region, in which the stator 11 is arranged, being designated as the stator housing 121. The transmission 14 is arranged in a transmission housing 122, which likewise forms a partial region of the housing 12. The stator housing 121 here is not sealed off against the other housing regions, but instead passes into the housing region where the rotor 112 is situated and into the transmission housing 122.

In the embodiment shown in FIG. 2, a lubricant tank T is provided, being situated outside the housing 12. For the lubrication and cooling, lubricant is drawn from the lubricant tank T by the auxiliary pump 13*z* and supplied to the transmission 14, the stator 111, the rotor 112 and the bearings of the rotor shaft 1121. This supplying of cool lubricant is done, for example, through the spray rings SR, which distribute the lubricant in a broad swath of the mentioned components. The lubricant moves through the electric motor 11 and collects by gravity in the lower partial region of the stator housing 121. Thus, in this embodiment as well, the stator housing 121 is at least partly filled with lubricant. The transmission housing 122, whose lower region lies beneath the lower region of the stator housing 121, is fluidically connected to the stator housing 121. In this lower region of the transmission housing 122, both the lubricant which has taken up heat in the electric motor 11 and the lubricant which has dripped off from the transmission 14 collect. From this lower region of the transmission housing 122, the lubricant pump 13 draws in lubricant and delivers it back to the lubricant tank T. Thus, the lubricant pump 13 also indirectly takes up lubricant from the stator housing 121. Alternatively, it would be possible to not have any lubricant tank T located outside the housing 12 and instead to arrange a lubricant sump in the lower region of the transmission housing 122 or in the lower region of the stator housing 121, from which the lubricant pump 13 will draw in lubricant and then deliver it back to the transmission 14 and to the electric motor 11 once again. The wet lubrication shown for the motor unit 1 has the effect that lubricant is found almost everywhere in the housing 12. In this way, a very efficient dissipation of heat is assured.

For the removal of the lubricant from the rotor gap RS, the embodiment shown in FIG. 2 also comprises a flow generating unit 15, which utilizes the rotation of the rotor 112 to generate an air flow, which is blown into the rotor gap RS. Also, in this embodiment the rotor 112 forms the pump of the flow generating unit 15. Thus, the internal friction in the electric motor 11 created by the lubricant in the rotor gap RS is significantly reduced, while at the same time the motor unit 1 has a simple design. The embodiment in FIG. 2 also comprises an optional oil separator 151, which removes lubricant from the air drawn in by the flow generating unit 15. A flow generating unit 15 can be used in all motor units 1 which are cooled and/or lubricated at least partly by a lubricant circuit, since when lubricant is present in an electric motor 11 the lubricant always gets into the rotor gap RS.

German patent application no. 10 2022 128325.9, filed Oct. 26, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A motor unit, comprising:
an electric motor arranged in a housing; and
a lubricant circuit, which cools and lubricates the electric motor, wherein the electric motor comprises a stator and a rotor mounted rotatably in the stator and being connected to the housing, wherein between the stator and the rotor there is a rotor gap, wherein the stator is enclosed for at least a portion by a stator housing arranged inside the housing, the stator housing filled at least partly with lubricant and belonging to the lubricant circuit;
at least one lubricant pump that is fluidically connected to the stator housing to receive lubricant from the stator housing, and wherein the lubricant pump comprises at least one outlet for lubricant that is fluidically connected to the stator and the rotor to deliver lubricant to the electric motor through the outlet; and
a flow generating unit, which draws in air from the housing and blows the air into the rotor gap to remove lubricant from the rotor gap and reduce internal friction in the electric motor,
wherein the rotor forms a pump of the flow generating unit and delivers air during rotation into the rotor gap or to the rotor gap, and
wherein a transmission is coupled to the rotor, wherein the transmission is situated in a transmission housing that is configured to form a partial region of the housing, wherein a pan is provided in the transmission housing and seals off one or more gear wheels at least partly against a lubricant reservoir, wherein the lubricant reservoir is formed by a partial region of the transmission housing situated at a bottom of the transmission housing, wherein the lubricant reservoir is part of the lubricant circuit and the lubricant pump is fluidically connected to the lubricant reservoir, draws in lubricant from the lubricant reservoir, and the outlet of the lubricant pump is fluidically connected to the transmission, wherein the lubricant pump delivers lubricant through the outlet thereof to one or more gear wheels of the transmission.

2. The motor unit according to claim 1, wherein the flow generating unit comprises an oil separator arranged in a flow direction of the air through the flow generating unit upstream from the rotor, wherein the oil separator separates lubricant present in the air in the housing and then delivers air with reduced lubricant content or lubricant-free air to the rotor working as the pump.

3. The motor unit according to claim 1, wherein the rotor comprises a rotor shaft rotatably mounted in the housing, wherein the rotor working as the pump of the flow generating unit draws in air axially to the rotor shaft through at least one end region of the rotor shaft and delivers the air taken in to the rotor shaft to the rotor gap.

4. The motor unit according to claim 1, wherein an air exit of the flow generating unit is situated substantially in a middle of the rotor in an axial direction to a rotor shaft and the air flows axially to the rotor shaft in two mutually opposite directions through the rotor gap or the air exit is situated in a marginal region of the rotor, axially to the rotor shaft, wherein the air flows axially to the rotor shaft in a direction through the rotor gap.

5. The motor unit according to claim 1, wherein an interior space of the stator housing not occupied by the stator is at least ⅔ filled with lubricant.

6. The motor unit according to claim 1, wherein the lubricant reservoir is fluidically connected to the stator housing and lubricant flows from the stator housing to the lubricant reservoir, wherein the lubricant pump receives lubricant from the lubricant reservoir and, through a fluidic connection between the stator housing and the lubricant reservoir, from the stator housing.

7. The motor unit according to claim 1, wherein the flow generating unit comprises an auxiliary pump that draws in air from the housing and blows the air into the rotor gap as needed or to supplement the rotor.

8. A motor unit, comprising:

an electric motor arranged in a housing; and a lubricant circuit, which cools and lubricates the electric motor, wherein the electric motor comprises a stator and a rotor mounted rotatably in the stator and being connected to the housing, wherein between the stator and the rotor there is a rotor gap, wherein the stator is enclosed for at least a portion by a stator housing arranged inside the housing, the stator housing filled at least partly with lubricant and belonging to the lubricant circuit;

at least one lubricant pump that is fluidically connected to the stator housing to receive lubricant from the stator housing, and wherein the lubricant pump comprises at least one outlet for lubricant that is fluidically connected to the stator and the rotor to deliver lubricant to the electric motor through the outlet; and a flow generating unit, which draws in air from the housing and blows the air into the rotor gap to remove lubricant from the rotor gap and reduce internal friction in the electric motor, wherein the rotor forms a pump of the flow generating unit and delivers air during rotation into the rotor gap or to the rotor gap, and wherein a return line connects the rotor gap to the stator housing and/or to a lubricant reservoir, wherein the return line carries the air blown from the flow generating unit through the rotor gap into the lubricant and the air travels through the lubricant back to the housing.

9. The motor unit according to claim 8, wherein the flow generating unit comprises an oil separator arranged in a flow direction of the air through the flow generating unit upstream from the rotor, wherein the oil separator separates lubricant present in the air in the housing and then delivers air with reduced lubricant content or lubricant-free air to the rotor working as the pump.

10. The motor unit according to claim 8, wherein the rotor comprises a rotor shaft rotatably mounted in the housing, wherein the rotor working as the pump of the flow generating unit draws in air axially to the rotor shaft through at least one end region of the rotor shaft and delivers the air taken in to the rotor shaft to the rotor gap.

11. The motor unit according to claim 8, wherein an air exit of the flow generating unit is situated substantially in a middle of the rotor in an axial direction to a rotor shaft and the air flows axially to the rotor shaft in two mutually opposite directions through the rotor gap or the air exit is situated in a marginal region of the rotor, axially to the rotor shaft, wherein the air flows axially to the rotor shaft in a direction through the rotor gap.

12. The motor unit according to claim 8, wherein an interior space of the stator housing not occupied by the stator is at least ⅔ filled with lubricant.

13. The motor unit according to claim 8, wherein a transmission is coupled to the rotor, wherein the transmission is situated in a transmission housing that is configured to form a partial region of the housing, wherein a pan is provided in the transmission housing and seals off one or more gear wheels at least partly against a lubricant reservoir, wherein the lubricant reservoir is formed by a partial region of the transmission housing situated at a bottom of the transmission housing, wherein the lubricant reservoir is part of the lubricant circuit and the lubricant pump is fluidically connected to the lubricant reservoir, draws in lubricant from the lubricant reservoir, and the outlet of the lubricant pump is fluidically connected to the transmission, wherein the lubricant pump delivers lubricant through the outlet thereof to one or more gear wheels of the transmission.

14. The motor unit according to claim 13, wherein the lubricant reservoir is fluidically connected to the stator housing and lubricant flows from the stator housing to the lubricant reservoir, wherein the lubricant pump receives lubricant from the lubricant reservoir and, through the fluidic connection between the stator housing and the lubricant reservoir, from the stator housing.

15. The motor unit according to claim 8, wherein the flow generating unit comprises an auxiliary pump that draws in air from the housing and blows the air into the rotor gap as needed or to supplement the rotor.

16. A method for reducing internal friction in a motor unit having: an electric motor arranged in a housing; and a lubricant circuit, which cools and lubricates the electric motor, wherein the electric motor comprises a stator and a rotor mounted rotatably in the stator and being connected to the housing, wherein between the stator and the rotor there is a rotor gap, wherein the stator is enclosed for at least a portion by a stator housing arranged inside the housing, the stator housing filled at least partly with lubricant and belonging to the lubricant circuit; and at least one lubricant pump fluidically connected to the stator housing to received lubricant from the stator housing, wherein the lubricant pump comprises at least one outlet for lubricant that is fluidically connected to the stator and the rotor to deliver lubricant to the electric motor through the outlet, and a flow generating unit, and wherein a transmission is coupled to the rotor, wherein the transmission is situated in a transmission housing that is configured to form a partial region of the housing, wherein a pan is provided in the transmission housing and seals off one or more gear wheels at least partly against a lubricant reservoir, wherein the lubricant reservoir is formed by a partial region of the transmission housing situated at a bottom of the transmission housing, wherein the lubricant reservoir is part of the lubricant circuit and the lubricant pump is fluidically connected to the lubricant reservoir, and the outlet of the lubricant pump is fluidically connected to the transmission, the method comprising:

drawing in air from the housing by the flow generating unit, wherein the rotor forms a pump of the flow generating unit;

blowing the air into the rotor gap via the flow generating unit, wherein the air blown in removes lubricant from the rotor gap and reduces the internal friction in the electric motor;

drawing in lubricant from the lubricant reservoir via the lubricant pump; and delivering lubricant through the outlet thereof to one or more gear wheels of the transmission.

17. A method for reducing internal friction in a motor unit having: an electric motor arranged in a housing; and a lubricant circuit, which cools and lubricates the electric motor, wherein the electric motor comprises a stator and a rotor mounted rotatably in the stator and being connected to the housing, wherein between the stator and the rotor there is a rotor gap, wherein the stator is enclosed for at least a portion by a stator housing arranged inside the housing, the stator housing filled at least partly with lubricant and belonging to the lubricant circuit; and at least one lubricant pump fluidically connected to the stator housing to receive lubricant from the stator housing, wherein the lubricant pump comprises at least one outlet for lubricant that is fluidically connected to the stator and the rotor to deliver lubricant to the electric motor through the outlet, and a flow generating unit, and wherein a return line connects the rotor gap to the stator housing and/or to a lubricant reservoir, the method comprising:

drawing in air from an interior airspace of the housing by the flow generating unit, wherein the rotor forms a pump of the flow generating unit;

blowing the air into the rotor gap via the flow generating unit, wherein the air blown in removes lubricant from the rotor gap and reduces the internal friction in the electric motor; and carrying the air blown from the flow generating unit through the rotor gap into the lubricant via the return line, whereinafter the air travels through the lubricant back to the interior airspace of the housing.

\* \* \* \* \*